US008347371B2

(12) United States Patent
Crespo et al.

(10) Patent No.: US 8,347,371 B2
(45) Date of Patent: *Jan. 1, 2013

(54) PROVIDING SELECTIVE ACCESS TO A WEB SITE (75) Inventors: Arturo E. Crespo, Sunnyvale, CA (US); Louis Vincent Perrochon, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/079,642

(22) Filed: Apr. 4, 2011

(65) Prior Publication Data

US 2011/0185412 A1    Jul. 28, 2011

Related U.S. Application Data (63) Continuation of application No. 11/331,797, filed on Jan. 13, 2006, now Pat. No. 7,930,736.

(51) Int. Cl.
*G06F 7/04* (2006.01)
*G06F 17/30* (2006.01)
*H04L 29/06* (2006.01)
*G06F 15/16* (2006.01)

(52) U.S. Cl. .................. 726/8; 726/7; 726/9; 726/27

(58) Field of Classification Search .................. 726/7–9, 726/27; 713/168, 179
See application file for complete search history.

(56) References Cited

U.S. PATENT DOCUMENTS

| 6,141,653 | A | 10/2000 | Conklin et al. |
| 6,260,024 | B1 | 7/2001 | Shkedy |
| 6,701,438 | B1 * | 3/2004 | Prabandham et al. ........... 726/11 |
| 6,748,426 | B1 * | 6/2004 | Shaffer et al. ................. 709/219 |
| 6,754,636 | B1 | 6/2004 | Walker et al. |
| 7,028,072 | B1 * | 4/2006 | Kliger et al. ................... 709/203 |
| 7,137,006 | B1 * | 11/2006 | Grandcolas et al. ........... 713/180 |
| 7,379,980 | B1 * | 5/2008 | Gilbert ........................... 709/220 |
| 7,437,554 | B1 * | 10/2008 | Arnold et al. ................. 713/160 |
| 7,908,649 | B1 * | 3/2011 | Arora et al. ........................ 726/7 |
| 2002/0087496 | A1 * | 7/2002 | Stirpe et al. ..................... 706/45 |
| 2002/0107918 | A1 * | 8/2002 | Shaffer et al. ................. 709/203 |
| 2002/0178074 | A1 | 11/2002 | Bloom |
| 2003/0149781 | A1 * | 8/2003 | Yared et al. .................... 709/229 |

(Continued)

OTHER PUBLICATIONS

"FirePoppy, Broker Pro.," FirePoppy, Inc., 1 page, [Archived on web.archive.org on Aug. 22, 2003; Retrieved on May 19, 2011] Retrieved from the internet <URL:http://replay.web.archive.org/20030822021619/http://www.firepoppy.com/broker_pro.phtml>.

(Continued)

*Primary Examiner* — Michael Simitoski
(74) *Attorney, Agent, or Firm* — Fenwick & West LLP (57) ABSTRACT A restricted web site has features that are selectively exposed to clients. A screening web site interacts with clients and collects data about the clients using passive and/or active techniques. The screening site generates a token for the client, and includes data in the token identifying the token and describing the client. The token is encoded in a cookie and saved in the client's web browser. The client subsequently provides the token to the restricted site. The restricted site validates the token to ensure that it is legitimate, has not expired, and has not been used before. The restricted site selects one or more features to provide to the client based on the data about the client in the token and/or on other information. If the client does not present a token or the token is invalid, the restricted site does not expose any features to the client.

17 Claims, 5 Drawing Sheets

U.S. PATENT DOCUMENTS

2005/0066011 A1* 3/2005 Wicks .......................... 709/217
2005/0154887 A1* 7/2005 Birk et al. .................... 713/168
2006/0074894 A1* 4/2006 Remahl et al. ................. 707/4

OTHER PUBLICATIONS

"Shopatron FAQ," FirePoppy, Inc., 3 pages, [Archived on web.archive.org on Jan. 17, 2004; Retrieved on May 19, 2011] Retrieved from the internet <URL:http://replay.web.archive.org/20040117021450/http://www.firepoppy.com/FAQ.phtml>.

Letter from Ed Stevens, Fire Poppy, Inc. to Jim Hudson, Sullivan Products, dated Sep. 12, 2000, 6 pages.

Screenshots Shopatron (#1-#7), Shopatron, Ltd. 1999, 7 pages, [retrieved from the internet on Aug. 10, 2000] Retrieved from the internet <http://shopatron.ooi.net/shopping_cart.phtml>, <http://shopatron.ooi.net/checkoutl.phtml>; <http://shopatron.ooi.netlcheckout3.phtml?multi=>;<http://shopatron.ooi .netlcheckout4.phtml>.

* cited by examiner

PROVIDING SELECTIVE ACCESS TO A WEB SITE

CROSS-REFERENCE TO RELATED APPLICATIONS

This application is a continuation of prior application Ser. No. 11/331,797, filed Jan. 13, 2006, the content of which is hereby incorporated by reference in its entirety.

BACKGROUND OF THE INVENTION

1. Field of the Invention

This invention pertains in general to network security and in particular to providing selective access to web sites such as those conducting electronic commerce.

2. Description of the Related Art

The Internet relies on standard protocols and open systems. Consider, for example, the World Wide Web, where web sites are identified by uniform resource locators (URLs) in a standard format. Any client on the Internet can use a given site's URL to access the site.

In certain circumstances, however, the operators of a web site desire to limit the set of clients (and users of the clients) that can access their site. Further, in some cases the operators want to completely hide the site from unauthorized clients. For example, the site can exist as part of a beta test, and the operators might want to completely hide the site from clients that are not enrolled in the test. In another example, the site can be part of an electronic commerce system, and the operators might want to hide or limit site access to only clients entitled to use the system. It is difficult to hide or restrict a web site given the open access normally provided by the Internet.

One way to hide the existence of a web site is through obscurity. The site can be located at a URL unlikely to be discovered by unauthorized clients. The URL can be provided to the beta testers or other limited set of clients that are expected to access the site. Unfortunately, such URLs are often leaked to the public, making the site accessible to anyone who learns the URL. It is difficult to change the URL once it has leaked, because the new URL must be distributed to all of the authorized clients and any coded logic that makes use of the URL must also change.

One common way to restrict access to a web site is to establish access control at the site. The home page of the site can require that clients provide valid authentication credentials before allowing access to the remainder of the site. This solution, of course, exposes the existence of the site and is not ideal for situations where the site should remain hidden. Further, requiring authentication credentials interrupts the control flow for the site and is undesirable. In a beta test, the site operators would like to test the site using real world conditions, and forcing an authentication step can disrupt the test if the production version of the site does not have authentication. Similarly, the site operators might not want to force an authentication in the middle of an electronic commerce transaction. Additionally, there are situations where the site operators desire a hybrid approach that hides the existence of a site from unauthorized clients yet also requires authorized clients to present credentials.

Looking at the issue more generally, site operators sometimes desire to treat different clients differently, such as by exposing different feature sets to different clients, either with or without requiring the clients to present authentication credentials. These variations are difficult to implement due to the open nature of the Internet. Accordingly, there exists a need in the art for a way to hide and/or restrict access to web sites on the Internet that does not suffer from the deficiencies described above.

BRIEF SUMMARY OF THE INVENTION

The above need is met by a method, system, and computer program product that selectively expose features of a restricted web site to a client. In one embodiment, a screening web site interacts with the client and selectively provides the client with a token. The restricted web site receives the token from the client, determines the features to expose in response, and exposes the determined features to the client.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

A. Overview

Figure 1:
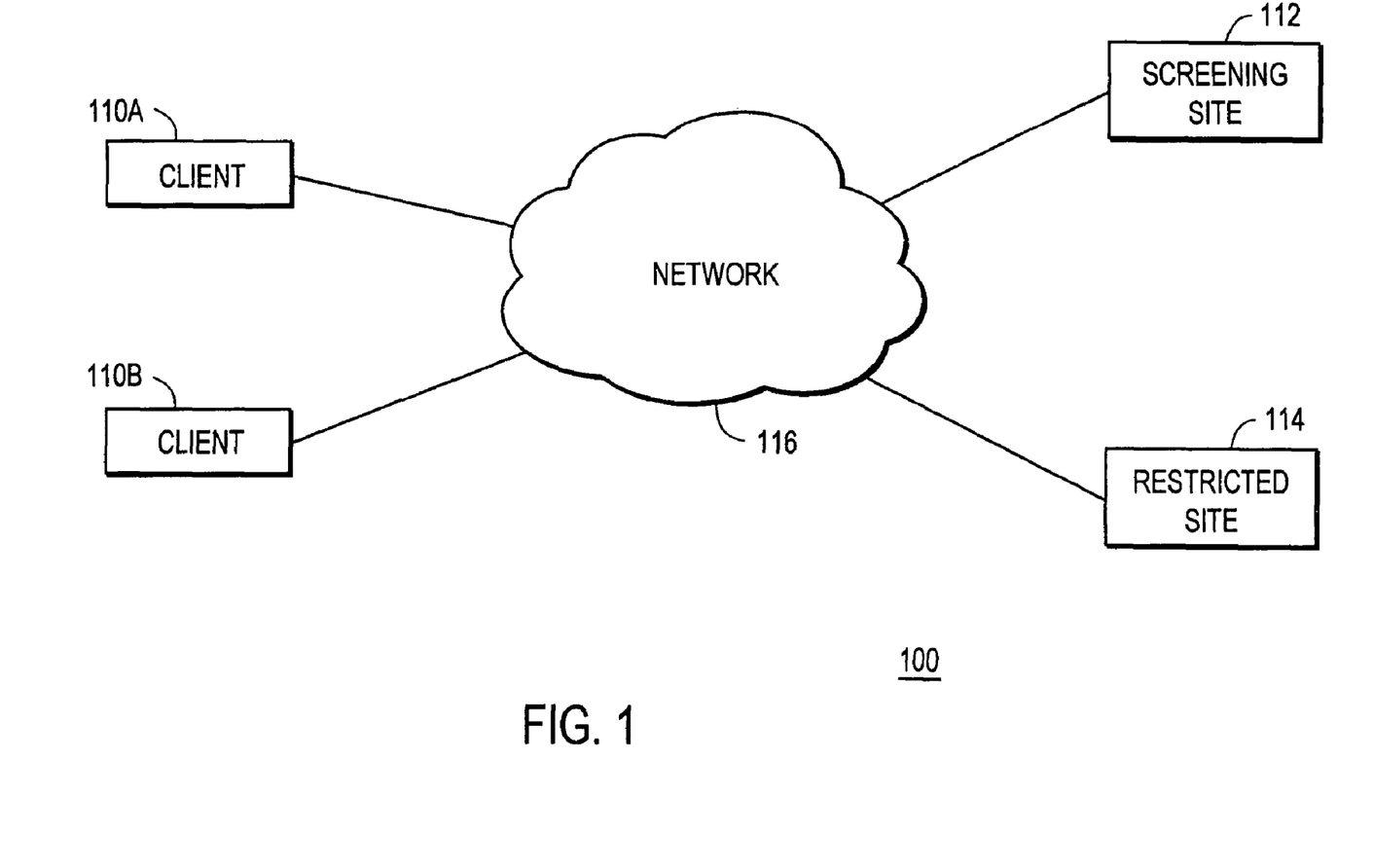
FIG. 1 is a high-level block diagram of a computing environment according to one embodiment.

FIG. 1 is a high-level block diagram of a computing environment 100 according to one embodiment of the present invention. FIG. 1 illustrates two clients 110A, 110B, a screening web site 112, and a restricted web site 114, all connected by a network 116. In one embodiment, the screening web site 112 provides tokens to the clients 110. The clients 110 present the tokens to the restricted site 114, and the restricted site selectively exposes features of the site to the clients depending upon the tokens. The use of the token thus allows the restricted site 114 to discriminate among the clients 110 without interfering with the normal flow of interaction with the site.

FIG. 1 and the other figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "110" in the text refers to reference numerals "110A" and/or "110B" in the figures).

In one embodiment, the client 110 is a computer utilized by an end-user to communicate with other computers on the network 116. The computer, for example, can be a personal computer executing a web browser such as MICROSOFT INTERNET EXPLORER, NETSCAPE BROWSER, or MOZILLA FIREFOX, that allows the end-user to retrieve and display content from web servers and other computers on the network 116. In other embodiments, the client 110 is a network-capable device other than a personal computer, such as a personal digital assistant (PDA), a cellular telephone, a pager, a television "set-top box" etc. Although FIG. 1 illustrates two clients 110, embodiments of the present invention can have thousands or millions of clients.

In one embodiment, the screening site 112 is a web site at a location defined by a uniform resource locator (URL). Depending upon the embodiment, the web site can be located at an address that is infrequently accessed by most clients, or at an address that is heavily trafficked by clients (e.g., www.google.com). Clients 110 use the URL to visit the screening site 112, and the site gathers data about the clients that visit it. The screening site 112 evaluates the data about the particular clients 110 and determines whether the clients are allowed to access the restricted site 114. If a client 110 is allowed access, the screening site provides the client 110 with a token. In one embodiment, the token is embedded in a cookie that the screening site 112 installs in the client's web browser. In some embodiments there are multiple screening sites 112.

The restricted site 114 is a web site providing a set of features to the clients 110. The restricted site 114 selectively exposes only certain features to certain clients. In one embodiment, the restricted site 114 uses data in the tokens it receives from the clients 110 to determine what features to expose. The set of features can include whether a client 110 can view the site at all, whether the client must provide authentication credentials, whether the client can use certain payment options (e.g., credit cards, gift certificates, scrip), etc. In some embodiments there are multiple restricted sites 114.

The restricted site 114 can be utilized as part of a beta test of a web-based application, where the features that are selectively exposed include the various functions of the application being tested. For example, the restricted site 114 can be used to test a sign-up system by only exposing the system to clients who have tokens (thereby preventing unauthorized clients from even accessing the sign-up form). Similarly, the restricted site can be used to provide selective access for testing an application that lacks a sign-up system. The restricted site 114 can also be used to test interactions among different systems, where one would not necessarily want the testers to provide authentication credentials each time they encounter a new system. For example, the restricted site can be used to test an electronic commerce system having separate systems for delivering electronic content and for paying for the content.

While the screening site 112 and restricted site 114 can be located at any location on the network 116, in one embodiment both sites are located within the same network domain. For reasons of security, many web browsers allow a web site to access only cookies within the same domain as the site. Thus the screening 112 and restricted 114 sites are within the same domain so that the restricted site can read the cookies (and tokens within cookies) placed by the screening site. In other embodiments, the web browsers may enable cross-domain cookie sharing, thereby eliminating the need for the sites to share a domain. In still other embodiments, the screening site 112 does not use cookies to store the tokens, thereby rendering the issue moot.

II. System Architecture

Figure 2:
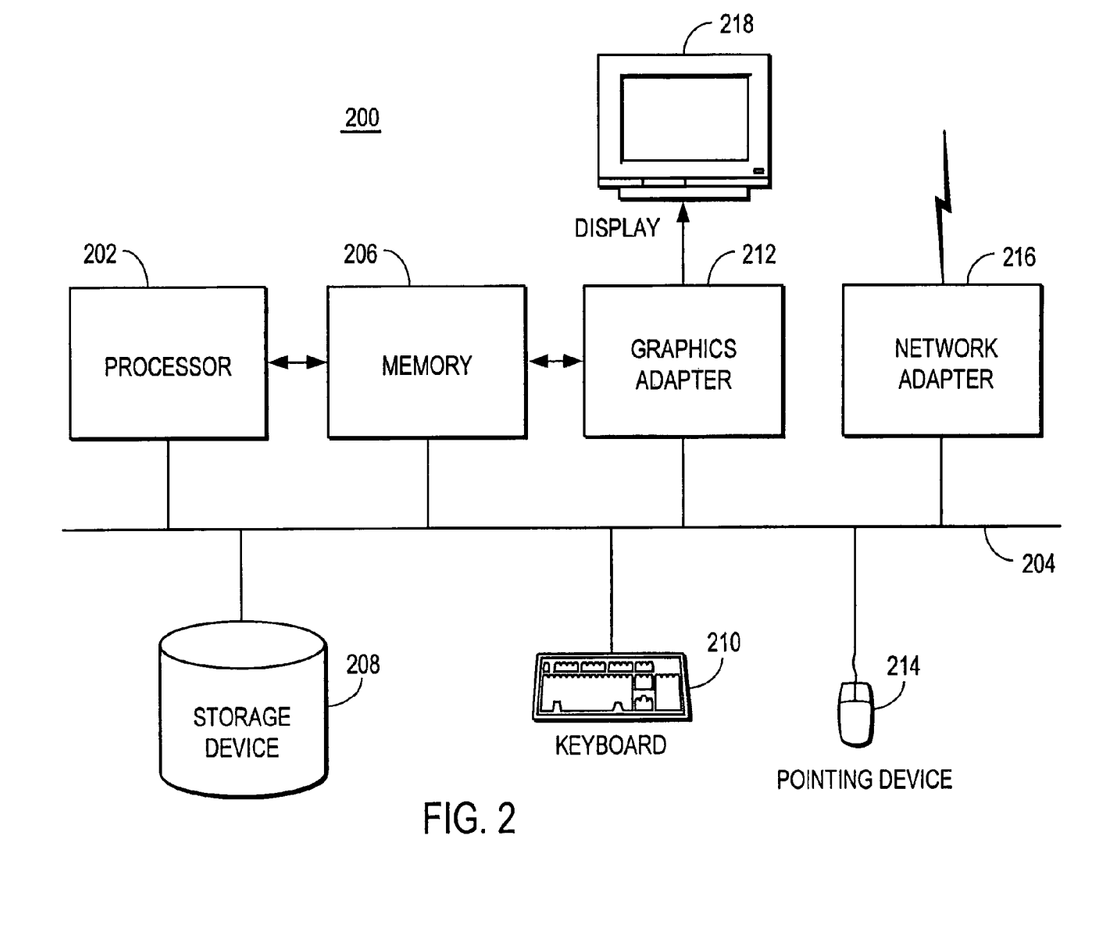
FIG. 2 is a high-level block diagram illustrating a functional view of a typical computer system for use as one of the entities illustrated in the environment of FIG. 1 according to one embodiment.

FIG. 2 is a high-level block diagram illustrating a functional view of a computer 200 for use as one of the entities illustrated in the environment 100 of FIG. 1 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86, SUN MICROSYSTEMS SPARC, or POWERPC compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 116.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computers 200 utilized by the entities of FIG. 1 can vary depending upon the embodiment and the processing power required by the entity. For example, the client 110 can be a personal computer, cellular telephone, or other consumer electronic device. The screening 112 and restricted 114 sites, in contrast, may run on more powerful computers and/or multiple computers working together to provide the functionality described herein.

Figure 3:
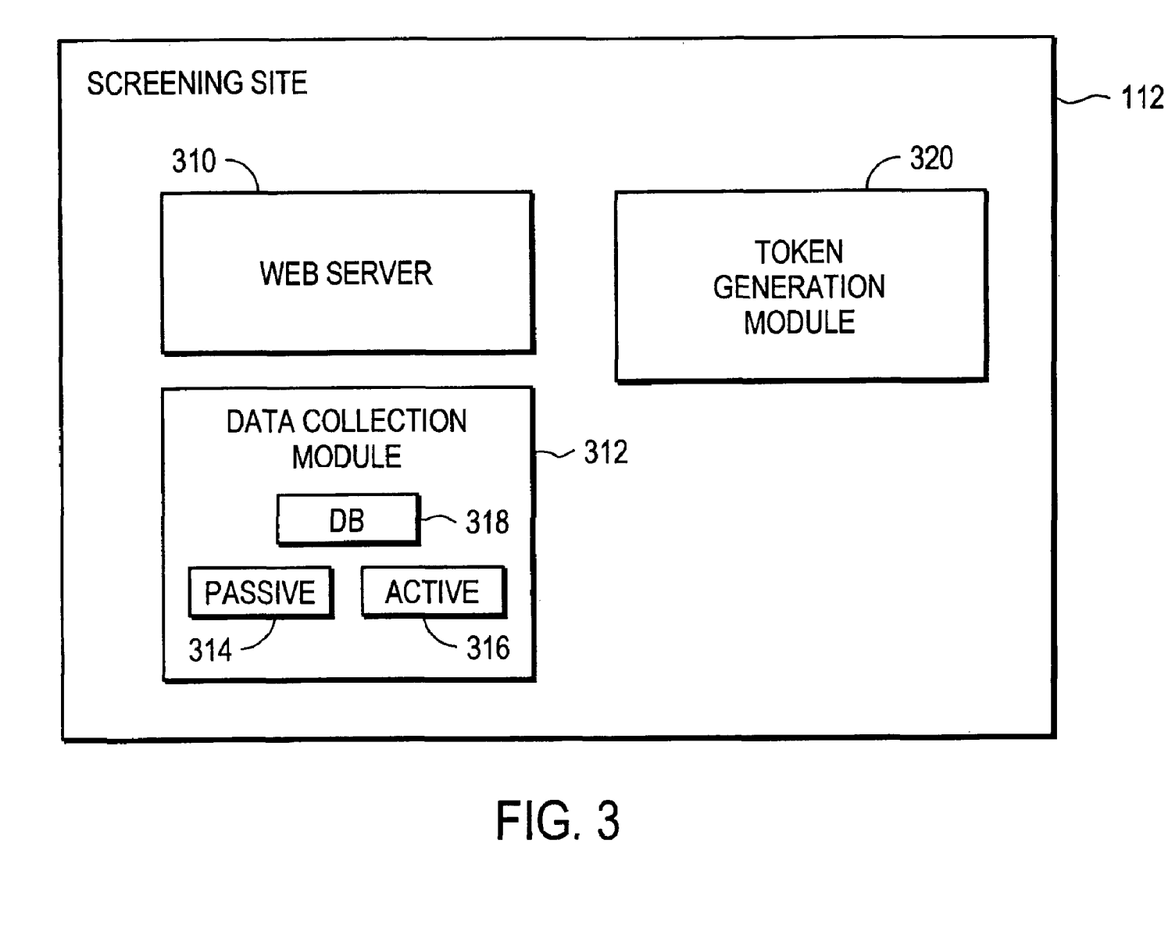
FIG. 3 is a high-level block diagram illustrating functional modules within the screening site of FIG. 1 according to one embodiment.

FIG. 3 is a high-level block diagram illustrating functional modules within the screening site 112 according to one embodiment. Those of skill in the art will recognize that other embodiments can have different and/or additional modules than the ones shown. In addition, the functionalities can be distributed among the modules differently than is described here.

A web server module 310 serves web pages and other content (such as cookies) to clients 110 that interact with the screening site 112. The web server 310 maintains a set of pages encoded in a markup language such as HTML. The pages contain text, images, code (e.g., JAVASCRIPT) and/or other content and can be static and/or dynamically generated. In one embodiment, the web server module 310 serves only the content necessary to support the operation of the screening site 112. In other embodiments, in contrast, the web server module 310 supports one or more web sites serving a wide variety of content.

A data collection module 312 collects data describing clients 110 and/or end-users that interact with the screening site 112. In one embodiment, the data collection module 312 includes a passive collection module 314 and an active collection module 316. The passive collection module 314 uses passive techniques to gather data. Passive techniques are techniques that are generally unnoticed by the end-user of the clients 110 and do not require end-user interaction. The data gathered through passive techniques can include, for example, the IP address of the client 110, the MAC address of the client, and cookies and other information stored by the client browser that are accessible to the screening site 112

(typically through interactions with the web server module 310). In addition, passive data include data that are derived or inferred from other passively-collected data. For example, the client's geographic location can often be inferred from the client's IP address.

The active collection module 316 uses active techniques to gather data. Active techniques are techniques that are noticeable to the end-users of the clients 110 and may require the end-users' active participation. For example, active techniques include providing web pages to a client 110 that ask the end-user to provide information such as a name, address, age, and the like. In addition, active techniques can include asking the end-user to provide information that is expected to be known by only the end-user or by a select group of people, such as authentication credentials or a beta tester ID. In one embodiment, access to the screening site 112 is secure, and only clients that supply the proper authentication credentials to the active collection module 316 are granted access to the remainder of the screening site.

In one embodiment, the data collection module 312 stores the collected data in a database 318 or other data store. The database 318 is accessible to the other modules in the screening site 112. In one embodiment, the database 318 is also accessible to other entities on the network 116, such as the restricted site 114. In one embodiment, each entry in the database is identified by a key that uniquely identifies the client 110 and/or end-user.

A token generation module 318 generates tokens granting access to the restricted site 114 for the clients 110. In one embodiment, the token generation module 318 selectively generates the tokens depending upon the data collected by the data collection module 312. For example, the token generation module 318 can generate tokens for only clients having a certain range of IP addresses, or for only clients that provide a correct password.

Each token includes a value uniquely identifying itself. In one embodiment, the value identifying the token is a serial number or other value that is incremented for each token. In other embodiments, the value identifying a token is calculated through an algorithm (e.g., the LUHN formula) that can be validated by an entity that receives the token. The token also includes a value that specifies a validity period for the token, such as a timestamp indicating the token's creation date and/or an expiration date. Further, in one embodiment, the token includes information collected by the data collection module 312. For example, a token can include the beta tester ID, client IP address, end-user's name and/or other such information. Similarly, in one embodiment the token includes the database key corresponding to the client 110 and/or end-user receiving the token. The information in the token can also identify the screening site 112 that issued the token. In one embodiment, the token and/or selected information within the token are protected using cryptographic techniques to prevent unauthorized access and/or alteration of the token.

The token generation module 318 causes the tokens to be stored at the clients 110. As mentioned above, one embodiment of the token generation module 320 encodes the tokens in cookies and stores the cookies in the clients' web browsers. In other embodiments, the token is stored in another persistent location in the browser or elsewhere on the client 110.

Figure 4:
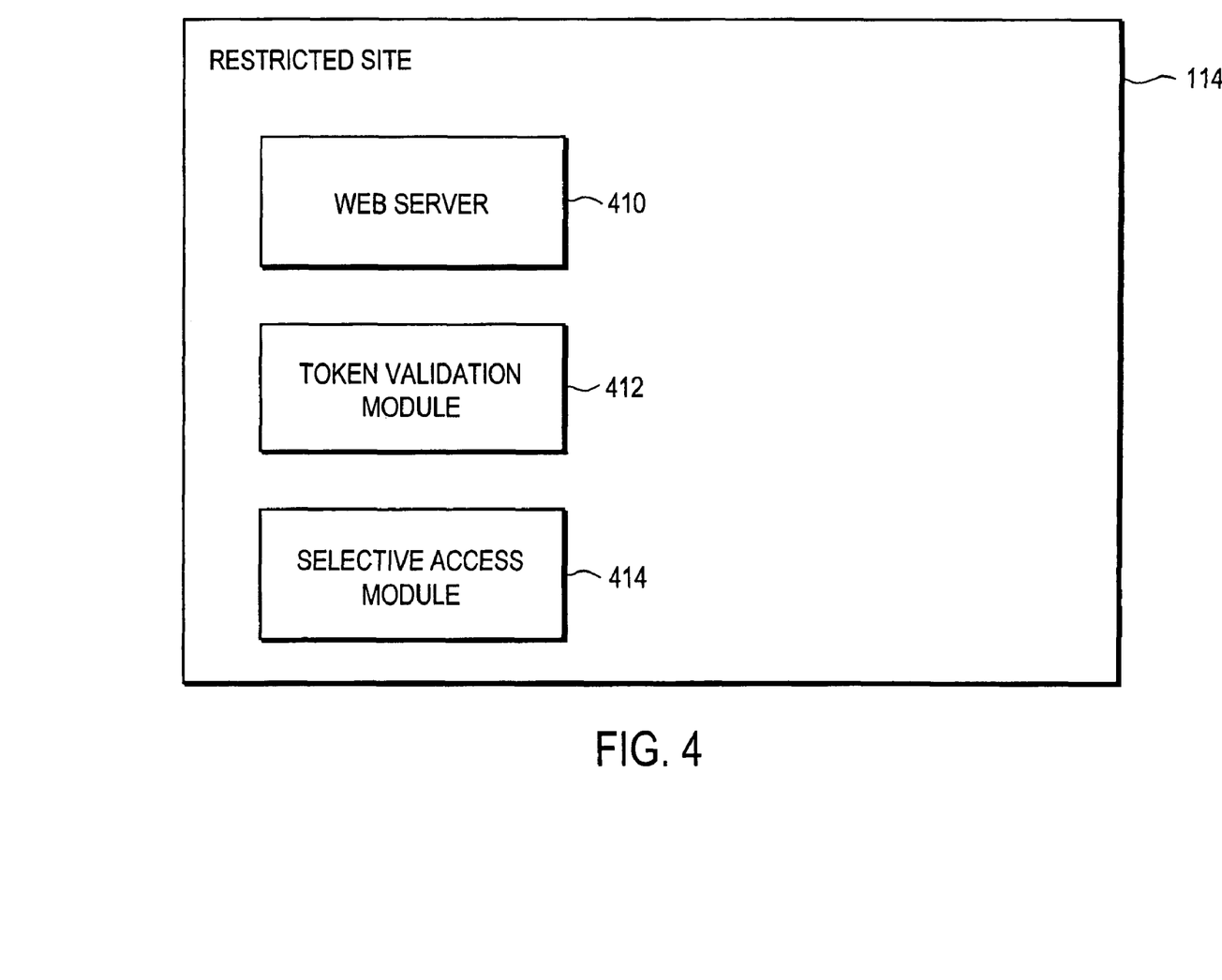
FIG. 4 is a high-level block diagram illustrating functional modules within the restricted site of FIG. 1 according to one embodiment.

FIG. 4 is a high-level block diagram illustrating functional modules within the restricted site 114 according to one embodiment. Those of skill in the art will recognize that other embodiments can have different and/or additional modules than the ones shown. In addition, the functionalities can be distributed among the modules differently than is described here.

A web server module 410 serves web pages and other content to clients 110 that interact with the restricted site 112. The web server module 410 is functionally equivalent to the web server module 310 in the screening site 112 and, in some embodiments, is the same web server. The content provided by the web server module 410 depends upon the features and functionality provided by the restricted site 114. In the embodiment where the restricted site 114 supports a beta test of a web-enabled application, the web server module 410 serves content for the application. In the embodiment where the restricted site 114 supports an electronic commerce system, the web server module 410 serves content allowing a client to purchase items and/or perform related transactions. In one embodiment, the web server module 410 can dynamically select and/or change the served content in response to information received from the clients and/or from other modules within the restricted site 114. This dynamism allows the web server module 410 to selectively expose different features to different clients.

A token validation module 412 validates tokens received from clients 110. Specifically, the token validation module 412 first verifies that a client 110 has presented a token (e.g., has provided the web server module 410 with a cookie having a token encoded within it). If the token is present, the token validation module 412 verifies that the token is legitimate (e.g., contains a valid ID and has not been altered) and has not expired. In one embodiment, a token can be used only a single time, and the token validation module 412 therefore determines whether the token has been used before. To this end, the token validation module 412 maintains a list or other data structure describing tokens that have been used already, and adds each new token to the list as it is encountered.

A selective access module 414 provides clients with selective access to the features of the restricted site 114. If the client 110 fails to provide a token, provides an illegitimate token, or provides an expired token, the selective access module 414 denies the client any access to the restricted site 114. This denial of access can be made to appear as if no site exists at the URL referenced by the client 110. For example, the selective access module 414 can present a web page containing the familiar "404-Page not found" error message to the client 110. In other embodiments, the selective access module 414 can provide the client 110 with a web page that describes the reasons for the denial of access, and/or other information.

If the client 110 presents a valid token, the selective access module 414 provides the client 110 with access to a set of features of the site. In one embodiment, the selective access module 414 maintains a set of rules or other equivalent logic that describe the features to make available based on given information about the client and/or end-user. The features provided to a particular client 110 can depend upon the information contained within the token presented by that client, information stored in the database 318 of the data collection module 312 in the screening site 112, and/or other information. In one embodiment, the selective access module 414 retrieves the database key from the token and uses it to access information about the client 110 and/or end-user contained in the data collection module 312 of the screening site 112.

For example, in an ecommerce example the token can include data indicating that a client is entitled to use credit cards to pay for transactions. In response, the selective access module 414 causes the web server 410 to present the client 110 with web pages that contain credit card payment options. If the token indicates that the client 110 is not entitled to use credit cards, the selective access module 414 causes the web server 410 to send web pages that lack the credit card payment options, show the options to be unavailable (e.g., the options are grayed-out), etc.

In one embodiment, the selective access module 414 provides an additional layer of security beyond the token by requiring clients 110 to present valid authentication credentials. For example, the selective access module 414 can require a client 110 submitting a valid token to also provide a valid login/password pair. Clients 110 that do not provide valid authentication credentials are denied access to the remainder of the restricted site 114.

III. Process/Example

Figure 5:
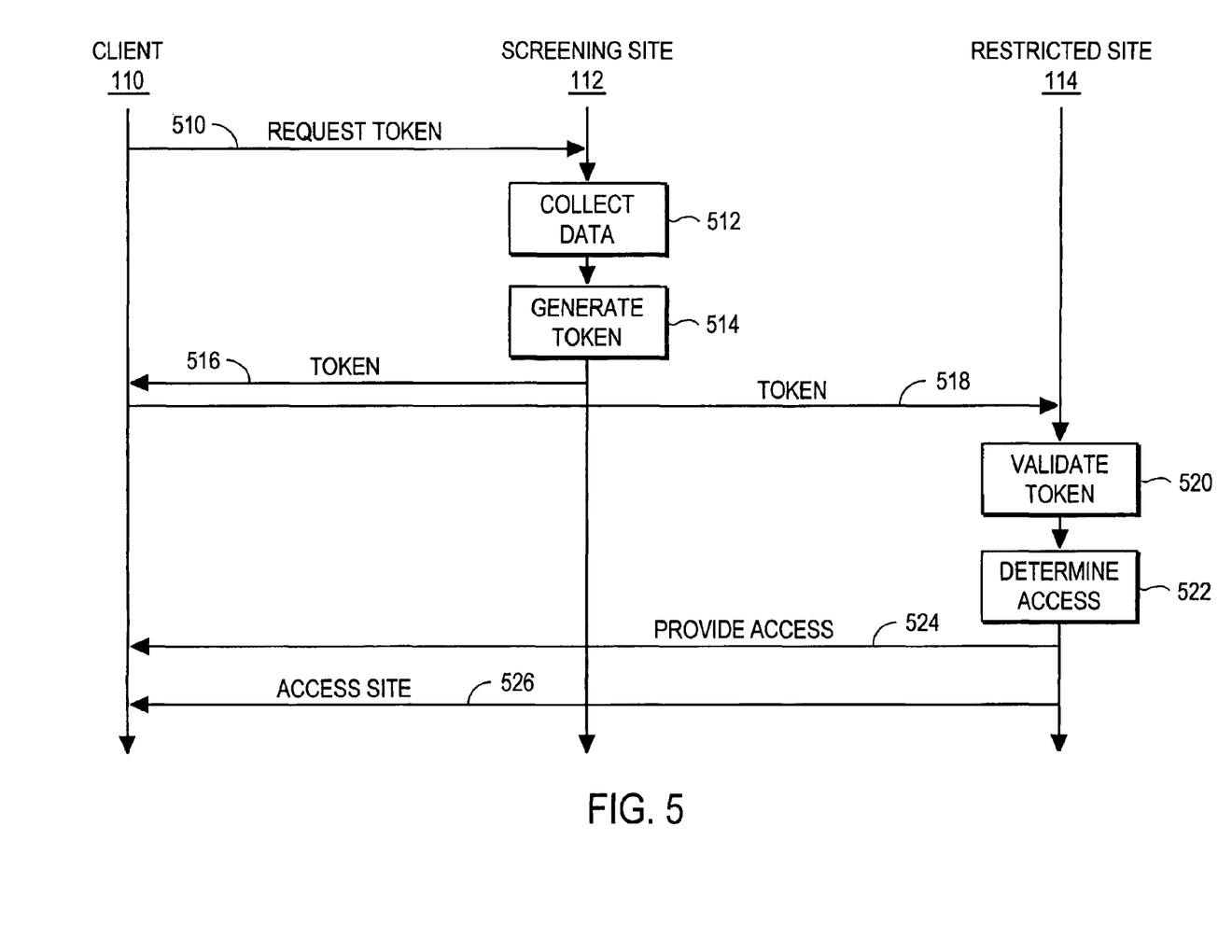
FIG. 5 is a ladder diagram illustrating interactions among the client, screening site, and restricted site according to one embodiment.

FIG. 5 is a ladder diagram illustrating interactions among the client 110, screening site 112, and restricted site 114 according to one embodiment. In the diagram, time flows from top to bottom and the horizontal lines represent interactions among entities. Actions performed by an entity are represented by text boxes. Those of skill in the art will recognize that other embodiments can contain different and/or additional interactions and actions, and that the events depicted in FIG. 5 can be performed in different orders.

Initially, the client 110 requests 510 a token from the screening site 112, typically by requesting a web page from the site. This request can occur as part of another event and the client need not visit the site specifically to get the token. For example, the screening site 112 can be part of an electronic commerce web site, where the client 110 is visiting the site in order to purchase an item. The web page that provides the token can be any one of the multiple web pages that the client 110 is expected to visit while shopping.

In response to the client request 510, the screening site 112 collects 512 data about the client using passive and/or active techniques. The collected data can include, for example, the IP address of the client and the mailing address of the end-user. The screening site 112 generates 514 a token for the client 110. The token contains a unique identifying value and a timestamp or other data that can be used to calculate a validity period. In some embodiments, the token also includes data describing the client 110, end-user, and/or screening site 112. The screening site 112 sends 516 the token to the client 110, typically by encoding the token in a cookie.

At some point, the client 110 requests a web page from the restricted site 114. For example, the client 110, while still at the screening site 112, could be presented with a page of payment options. This page can include an option that, when selected, takes the client 110 to the restricted site 114. As a consequence of selecting the option, therefore, the client 110 requests a page from the restricted site. As part of this interaction, the restricted site 114 receives 518 from the client 110 the token provided by the screening site 112 (if the token is present).

The restricted site 114 validates 520 the token to ensure that it is legitimate, has not expired, and has not been used before. In addition, the restricted site 114 determines the set of features to expose to the client 110. This determination can be based on information within the token, on information within the data collection database 318, and/or based on other information. The restricted site 114 provides 524 the client with access to the exposed feature set. If the client 110 does not present a token, or the token is invalid, the restricted site 114 exposes no features to the client 110 and, in one embodiment, reacts as if the site does not exist. The client 110 accesses 526 the site 114 and utilizes the exposed features. For example, the restricted site 114 can determine from the token that the client 110 is entitled to use credit cards to pay for transactions. Therefore, the restricted site 114 provides the client 110 with web pages that include credit card payment options, thereby allowing the client 110 to access the credit card payment feature.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A method for providing a user with restricted features of a restricted web site, comprising:
   providing a restricted web site having a set of restricted features, the restricted site adapted to:
      receive from the user a token having a key incorporated therein;
      validate the token received from the user;
      responsive to a determination that the token is invalid, provide the user with none of the features in the set of restricted features and interact with the user as if the restricted site did not exist; and
      responsive to a determination that the token is valid:
         retrieve data about the user from a database entry using the key incorporated into the token;
         determine selected features in the set of restricted features that the user may access based at least in part on the data retrieved from the database entry; and
         provide the selected features to the user.

2. The method of claim 1, further comprising:
   providing another restricted web site adapted to receive the token from the user and selectively provide at least some of the features in the set to the user based at least in part on the received token.

3. The method of claim 1, wherein the restricted site is further adapted to:
   prompt the user to provide an authentication credential;
   receive the authentication credential from the user;
   validate the login/password received from the user; and
   provide the selected features to the user based at least in part on a determination that the login/password is valid.

4. The method of claim 1, wherein validating the token received from the user comprises at least one of:
   determining whether the token is legitimate;
   determining whether the token has expired; and
   determining whether the token has been used before.

5. The method of claim 1, further comprising:
   providing a screening web site adapted to:
      store data about the user in the database entry identified by the key; and
      selectively provide the user with the token having the key incorporated therein.

6. The method of claim 5, wherein the screening web site is further adapted to:
   incorporate at least a part of the data about the user into the token provided to the user.

7. A system for providing a user with restricted features of a restricted web site, comprising:
   a restricted web site having a set of restricted features comprising:
      a token validation module for receiving from the user a token having a key incorporated therein, validating the token received from the user, responsive to a determination that the token is invalid, providing the user with none of the features in the set of restricted features and interacting with the user as if the restricted site did not exist, and, responsive to a determination that the token is valid, retrieving data about the user from a database entry using the key incorporated into the token; and a selective access module for determining selected features in the set of restricted features that the user may access based at least in part on the data retrieved from the database entry, and providing the selected features to the user.

8. The system of claim 7, further comprising another restricted web site adapted to receive the token from the user and selectively provide at least some of the features in the set to the user based at least in part on the received token.

9. The system of claim 7, wherein the selective access module is further adapted to:
prompt the user to provide an authentication credential;
receive the authentication credential from the user;
validate the login/password received from the user; and
provide the selected features to the user based at least in part on a determination that the login/password is valid.

10. The system of claim 7, wherein the token validation module is further adapted to perform at least one of:
determining whether the token is legitimate;
determining whether the token has expired; and
determining whether the token has been used before.

11. The system of claim 7, further comprising:
a screening web site comprising:
a data collection module for storing data about the user in the database entry identified by the key; and
a token generation module for selectively providing the user with the token having the key incorporated therein.

12. The system of claim 11, wherein the token generation module incorporates at least a part of the data about the user into the token provided to the user.

13. A non-transitory computer-readable storage medium encoded with executable computer program code for providing a user with restricted features of a restricted web site, the computer program code comprising program code for:

providing a restricted web site having a set of restricted features, the restricted site adapted to:
receive from the user a token having a key incorporated therein;
validate the token received from the user;
responsive to a determination that the token is invalid, provide the user with none of the features in the set of restricted features and interact with the user as if the restricted site did not exist; and
responsive to a determination that the token is valid:
retrieve data about the user from a database entry using the key incorporated into the token;
determine selected features in the set of restricted features that the user may access based at least in part on the data retrieved from the database entry; and
provide the selected features to the user.

14. The storage medium of claim 13, further comprising:
providing another restricted web site adapted to receive the token from the user and selectively provide at least some of the features in the set to the user based at least in part on the received token.

15. The storage medium of claim 13, wherein the restricted site is further adapted to:
prompt the user to provide an authentication credential;
receive the login/password pair from the user;
validate the login/password received from the user; and
provide the selected features to the user based at least in part on a determination that the login/password is valid.

16. The storage medium of claim 13, wherein validating the token received from the user comprises at least one of:
determining whether the token is legitimate;
determining whether the token has expired; and
determining whether the token has been used before.

17. The storage medium of claim 13, wherein the computer program code further comprises program code for:
providing a screening web site adapted to:
store data about the user in the database entry identified by the key; and
selectively provide the user with the token having the key incorporated therein.

* * * * *